(12) United States Patent
Sansone et al.

(10) Patent No.: US 8,070,363 B2
(45) Date of Patent: Dec. 6, 2011

(54) BEARING ARRANGEMENT

(75) Inventors: Alessandro Sansone, Petacciato (IT); Wilco Van Dalen, BJ Sleeuwijk (NL); Jos Holsnijders, EN Leerdam (NL)

(73) Assignee: AB SKF, Göteborg (SE)

( * ) Notice: Subject to any disclaimer, the term of this patent is extended or adjusted under 35 U.S.C. 154(b) by 693 days.

(21) Appl. No.: 11/795,259

(22) PCT Filed: Jan. 4, 2006

(86) PCT No.: PCT/EP2006/000023
§ 371 (c)(1), (2), (4) Date: Oct. 17, 2007

(87) PCT Pub. No.: WO2006/074867
PCT Pub. Date: Jul. 20, 2006

(65) Prior Publication Data
US 2008/0080799 A1    Apr. 3, 2008

(30) Foreign Application Priority Data
Jan. 14, 2005 (EP) ..................... 05000679

(51) Int. Cl.
*F16C 32/00* (2006.01)
*F16C 41/04* (2006.01)

(52) U.S. Cl. ..................................... 384/448

(58) Field of Classification Search .......... 384/448; 324/174, 207.25; 73/514.31, 514.39
See application file for complete search history.

(56) References Cited

U.S. PATENT DOCUMENTS

| 2,662,292 A | * | 12/1953 | Pickard | 33/781 |
| 3,917,142 A | * | 11/1975 | Guarderas | 226/38 |
| 6,574,882 B1 | * | 6/2003 | Kondo | 33/773 |
| 2004/0074315 A1 | | 4/2004 | Hwang | |

FOREIGN PATENT DOCUMENTS

| JP | 10-252749 A | 9/1998 |
| JP | 2003-130049 A | 5/2003 |
| JP | 2003-294035 A | 10/2003 |

OTHER PUBLICATIONS

International Search Report.

* cited by examiner

*Primary Examiner* — James Pilkington
(74) *Attorney, Agent, or Firm* — Buchanan Ingersoll & Rooney PC

(57) ABSTRACT

A bearing arrangement comprises at least one bearing ring and at least one machine part with which the bearing ring is connected. The bearing arrangement is equipped with a device for detecting relative movement between at least one of the bearing rings and one of the machine parts. To facilitate the measurement of creep between one of the bearing rings and one of the machine parts, the device for detecting relative movement is located in or at the machine part and has a contact element which contacts the bearing ring, wherein a sensor element is arranged in or at the device to detect the relative movement between the device and the contact element.

7 Claims, 2 Drawing Sheets

BEARING ARRANGEMENT

TECHNOLOGICAL FIELD

Figure 1:
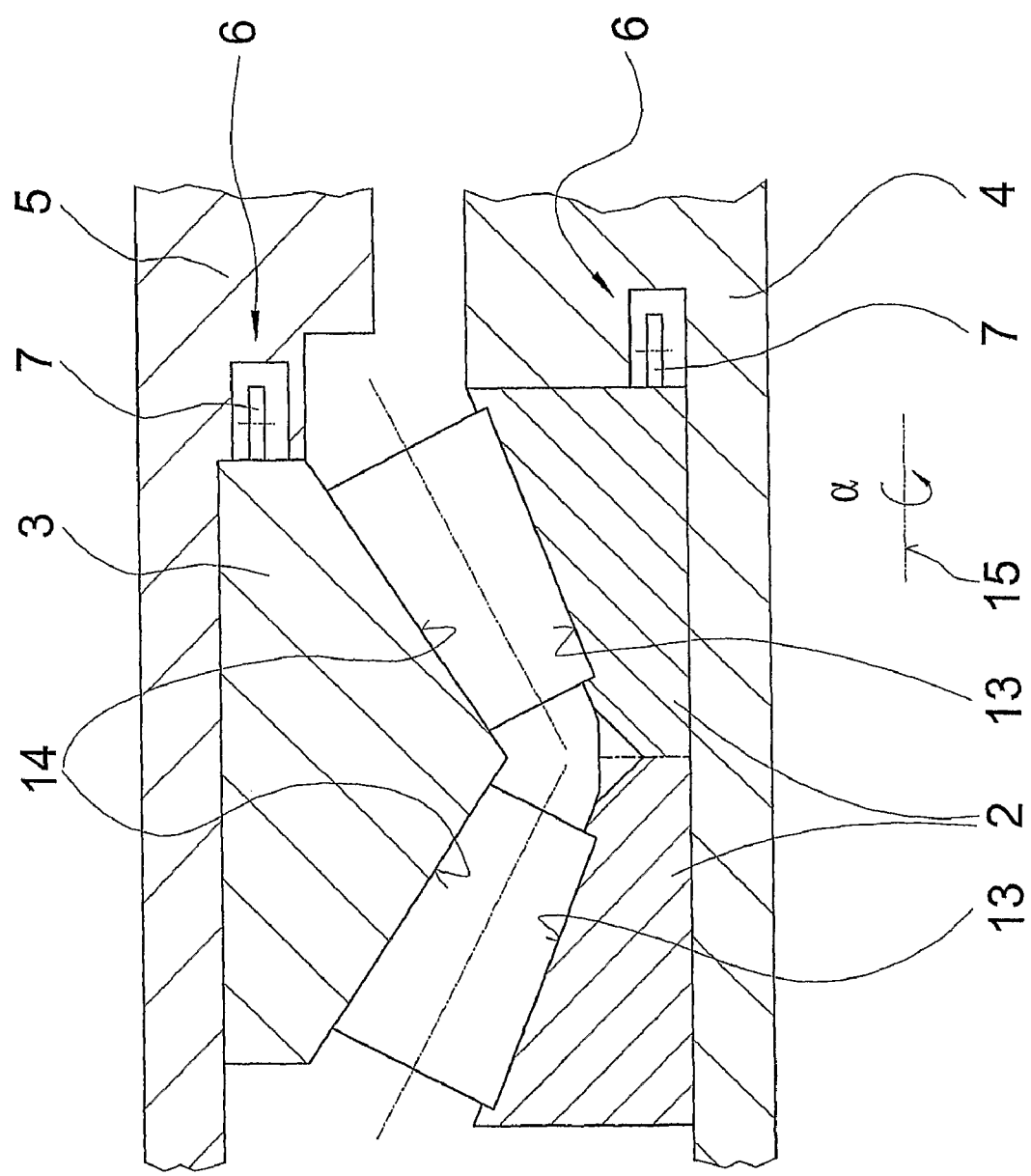

The invention relates to a bearing arrangement having at least one bearing ring and at least one machine part with which the bearing ring is connected, wherein the bearing arrangement is equipped with a device for detecting the relative movement between at least one of the bearing rings and one of the machine parts.

BACKGROUND DISCUSSION

A bearing arrangement of this type is disclosed in US 2004/0074315 A1. This document suggests a method for determining bearing parameters like radial load or interference fit of a bearing. The bearing has an inner and an outer ring which are secured by an interference fit with the machine parts which bear them. Angular rotation of the bearing rings relative to the machine parts can occur (creep) in response to the radial load. The measurements of the angular velocity of the bearing ring and the mounting component are compared to determine the creep rate between the ring and the mounting component.

The observed creep rate and angular velocity measurements are utilized with either measured radial load data or interference fit data for the bearing to extrapolate a curve fit for either the interference fit or the radial load experienced by the bearing. To determine the creep two Hall effect sensors are arranged at the face side of the bearing ring and the machine part respectively. By comparison of the detected pulses of both Hall effect sensors by a computer an information can be generated with respect to the occurring creep of the bearing ring relatively to the machine part which bears it.

The proposed pre-known arrangement allows the detection of creep in a bearing arrangement but demands not only a certain space for positioning the necessary sensors but also a quite high expenditure. Consequently, the known creep detection system is not applicable for all bearing arrangements. Especially problems occur when the available space is not sufficient to arrange the necessary sensors and when the creep has to be measured between the stationary parts.

SUMMARY

Therefore, it is the object of the invention to create a bearing arrangement, especially for large size bearings and preferably for wind energy systems, which allows the detection of creep movements between a bearing ring and a machine part on which the ring is arranged in a precise and easy way. It should be possible to survey the creep by a device which is not expensive and is reliable during a long period of time.

The solution of this object according the invention is characterized in that the device for detecting the relative movement between at least one of the bearing rings and one of the machine parts is located in or at the machine part and has a contact element which contacts the bearing ring, wherein a sensor element is arranged in or at the device to detect the relative movement between the device and the contact element.

According to the invention the contact element has physical contact to the bearing ring which has to be surveyed with respect to creep. The movements of the contact element delivers a measure for occurring creep. No complex sensors are necessary to detect creep.

Preferably, the machine part or a retainer ring used for locking the machine part has a notch or groove for inserting the device.

The contact element can be a wheel which contacts the bearing ring at a face side or at a radially oriented area with its circumference. The wheel can be equipped with a cover from elastic material on its circumference to ensure a high friction between the circumference of the wheel and the bearing ring for preventing slippage. The cover can be a ring element arranged on the circumference of the wheel. Alternatively, the wheel can be made from an elastic material. The elastic material is preferably rubber.

The sensor element is preferably a rotational sensor which can detect a rotational angle. The sensor element can also be designed to detect a rotational speed.

In a preferred embodiment the bearing ring which is contacted by the contact element is the inner ring of the bearing arrangement and the machine part is a rotating shaft element or a retainer ring connected to it. Alternatively or additionally the bearing ring which is contacted by the contact element can be the outer ring of the bearing arrangement and the machine part can be a housing element or a retainer ring connected to it.

With the proposed bearing arrangement the creep movements over time can be detected reliable. A preferred application is the survey of creep of the bearing rings, especially of the rotating bearing ring/rings, of a wind energy system and other large size bearing applications.

Because the registration of relative movements between the bearing ring and the machine part which bears it is surveyed by a mechanical component, i.e. the contact element (wheel), the reliability of the arrangement is high.

BRIEF DESCRIPTION OF THE DRAWING FIGURES

The drawing shows an embodiment of the bearing arrangement according to the invention.

Figure 2:
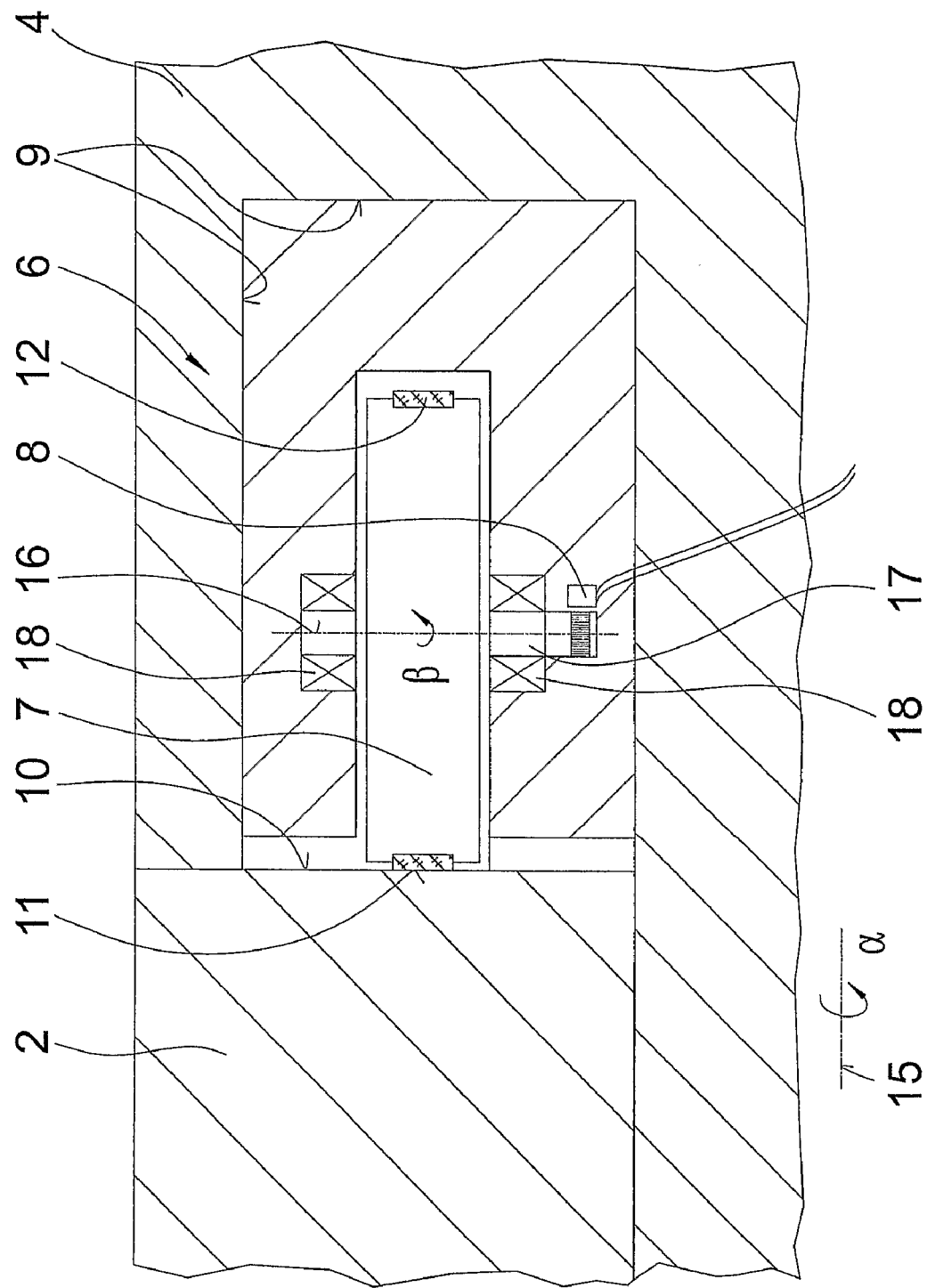

FIG. 1 shows a cross section of a double row taper roller bearing with a device for detecting the creep between one of the bearing rings and one of the machine parts and FIG. 2 shows an enlarged view of the device for detecting the creep.

DETAILED DESCRIPTION

FIG. 1 shows a bearing arrangement 1 which is used to bear the rotor of a wind energy system. The bearing arrangement 1 is designed as a double row taper roller bearing. The bearing has two inner rings 2 with raceways 13 and an outer ring 3 with two raceways 14. The inner rings 2 are connected to a machine part 4 which is the shaft being part of the rotor of the wind energy system. The outer ring 3 is connected to a machine part 5 which is a housing.

In operation it is possible that the rotating inner ring 2 rotates relatively to the shaft 4. This creeping movement is disadvantageous and should be avoided. Creeping means that the bearing ring 2 rotates relatively to the shaft 4 around the axis 15 by the angle $\alpha$.

To find out if there is any necessity for actions, i.e., if a creeping movement occurs, the bearing arrangement 1 is equipped with a device 6 for detecting the relative movement of the bearing ring 2 relative to the machine part 4 and/or with a device 6 for detecting the relative movement of the bearing ring 3 relative to the machine part 5.

In FIG. 1, two devices 6 are arranged for purposes of illustration. It is noted that normally only one of the devices 6 is used for detecting the creep of the rotating bearing ring.

FIG. 2 shows in more detail the design of the device 6 for detecting the creep between one of the bearing rings and the adjacent machine part.

The device 6 is located and fixed in a notch 9 which is machined into the adjacent machine part 4. It should be mentioned that the machine part 4, 5 can be the shaft or the housing of the arrangement but also a retainer ring which is used often to lock axially the bearing ring 2, 3.

The device 6 has a wheel 7 which can rotate around an axis 16 and which contacts the face side 10 of the bearing ring 2. The axis 16 is perpendicular to the axis 15. The wheel 7 is arranged on a shaft 17 which is rotatable by bearings 18. The circumference 11 of the wheel is equipped with a rubber ring 12 with high friction ability. The rubber ring 12 ensures that the wheel 7 rotates without slippage when a rotational movement of the inner ring 2 relatively to the shaft 4 occurs. As can be seen from FIG. 2, a rotational movement of the inner ring 2 by an angle $\alpha$ around the axis 15 leads to a rotation of the wheel 7 by an angle $\beta$. The relation between the angles $\alpha$ and $\beta$ is linear and depends on the geometry of the device 6 and its elements.

If rotation of the wheel 7, i.e., an angle $\beta$, occurs the rotational movement is detected by a sensor element 8. Suitable sensor elements are well known in the art. The sensors element 8 can digitally detect pulses, e.g., 360 pulses per revolution of the shaft 17. A computer (not shown) stores the detected data. After a certain time which can be a couple of days of even weeks the graph of the angle $\beta$ over time can be plotted to discover the creep movements of the inner ring 2 relatively to the shaft 4. Of course, also on-line monitoring of the movement can take place.

The sensor element 8 and/or the computer storing the measured data can be designed to monitor the position and/or the speed of the creep movement. The data can be stored in the vicinity of the bearing arrangement 1 or can be transferred to a survey system which can be remote from the arrangement 1. In the latter case condition monitoring of the bearing arrangement can take place, normally together with other data and parameter of the bearing unit.

The device 6 also includes a housing disposed in the notch 9. As illustrated in FIG. 2, the wheel 7 projects from a first end of the housing, and a second end of the housing opposite the first end abuts a bottom wall of the notch 9 to prevent the wheel 7 from moving out of contact with the face side 10 of the bearing ring 2.

The invention claimed is:

1. Bearing arrangement comprising:
   a first machine part;
   a second machine part;
   a first bearing ring connected to the first machine part and possessing a face side;
   a second bearing ring connected to the second machine part;
   a rotatable wheel positioned in contact with the face side of the first bearing ring to rotate about an axis upon occurrence of relative rotational movement between the first bearing ring and the first machine part; and
   a rotational sensor operatively associated with the wheel which detects rotational movement of the wheel about the axis to indicate creep movement of the first bearing ring and the first machine part,
   wherein the rotatable wheel is held in a housing and projects from a first end of the housing, the housing is disposed in a notch in the first machine part, and a second end of the housing opposite the first end abuts a bottom wall of the notch to prevent the rotatable wheel from moving out of contact with the face side of the first bearing ring.

2. Bearing arrangement according to claim 1, wherein the first bearing ring is an inner bearing ring and the first machine part is a shaft.

3. Bearing arrangement according to claim 1, wherein the wheel comprises an elastic material.

4. Bearing arrangement according to claim 1, wherein the wheel is made of rubber.

5. Bearing arrangement according to claim 1, wherein the second bearing ring is an outer bearing ring.

6. Bearing arrangement according to claim 1, further comprising a rubber ring mounted on an outer circumference of the wheel.

7. Bearing arrangement according to claim 1, wherein the rotatable wheel is arranged on a shaft.

\* \* \* \* \*